United States Patent
Bi et al.

(10) Patent No.: US 12,200,507 B2
(45) Date of Patent: Jan. 14, 2025

(54) POSITIONING REFERENCE SIGNAL TRANSMISSION METHOD AND APPARATUS, DEVICE, AND STORAGE MEDIUM

(71) Applicant: ZTE CORPORATION, Guangdong (CN)

(72) Inventors: Cheng Bi, Guangdong (CN); Shijun Chen, Guangdong (CN); Dawei Chen, Guangdong (CN); Yuanyuan Wang, Guangdong (CN)

(73) Assignee: ZTE CORPORATION (CN)

( * ) Notice: Subject to any disclaimer, the term of this patent is extended or adjusted under 35 U.S.C. 154(b) by 649 days.

(21) Appl. No.: 17/273,344

(22) PCT Filed: Sep. 3, 2019

(86) PCT No.: PCT/CN2019/104204
§ 371 (c)(1),
(2) Date: Mar. 4, 2021

(87) PCT Pub. No.: WO2020/048452
PCT Pub. Date: Mar. 12, 2020

(65) Prior Publication Data
US 2021/0345130 A1   Nov. 4, 2021

(30) Foreign Application Priority Data
Sep. 4, 2018  (CN) .......................... 201811026575.5

(51) Int. Cl.
*H04W 4/00* (2018.01)
*H04B 7/06* (2006.01)
(Continued)

(52) U.S. Cl.
CPC .......... *H04W 16/28* (2013.01); *H04B 7/0617* (2013.01); *H04L 5/0051* (2013.01); *H04W 24/10* (2013.01)

(58) Field of Classification Search
None
See application file for complete search history.

(56) References Cited

U.S. PATENT DOCUMENTS

2017/0208563 A1*  7/2017  Fischer ................. H04W 16/32
2017/0366244 A1* 12/2017  Lee ........................ H04B 7/024
2019/0245663 A1*  8/2019  Kim ...................... H04L 5/0048

FOREIGN PATENT DOCUMENTS

CN    101616360 A    12/2009
CN    103812546 A    5/2014
(Continued)

OTHER PUBLICATIONS

R1-1808853, "Discussion on scenarios and enhancements for NR positioning." 3GPP TSG RAN WG1 Meeting #94. Gothenburg, Sweden. (2018).
(Continued)

*Primary Examiner* — Zewdu A Beyen
(74) *Attorney, Agent, or Firm* — McDonald Hopkins LLC

(57) ABSTRACT

Provided are a positioning reference signal (PRS) transmission method and apparatus, and a storage medium. A PRS sending end presets PRS blocks having the same number as the number of shaped beams, a corresponding PRS sequence in each PRS block by using a preset sequence generation rule, and each PRS block containing the corresponding PRS sequence is sent according to a preset sending order of the PRS blocks in a polling manner through a shaped beam corresponding to the each PRS block. A PRS receiving end acquires a first PRS block sent by the PRS sending end; and when the first PRS block contains a block index, a sending index of a shaped beam corresponding to the first PRS block
(Continued)

---

Preset PRS blocks having a same number as a number of shaped beams, and set a corresponding PRS sequence in each PRS block by using a preset sequence generation rule — 101

Send, through a shaped beam corresponding to each PRS block, each PRS block containing the corresponding PRS sequence in a polling manner according to a preset sending order of the PRS blocks — 102 corresponding to the block index is determined according to preset correspondence; or when the first PRS block contains no block index, a sending index of a shaped beam corresponding to the first PRS block is determined according to a preset calculation rule. The sending index of the shaped beam is used for determining a time-domain position of the shaped beam.

20 Claims, 4 Drawing Sheets

(51) Int. Cl.
*H04L 5/00* (2006.01)
*H04W 16/28* (2009.01)
*H04W 24/10* (2009.01)

(56) References Cited

FOREIGN PATENT DOCUMENTS

| CN | 103856894 A | 6/2014 |
|----|-------------|--------|
| CN | 106341882 A | 1/2017 |
| EP | 3306337 A1 | 4/2018 |
| WO | 2015096809 A1 | 7/2015 |
| WO | 2017164925 A1 | 9/2017 |
| WO | 2018069208 A1 | 4/2018 |

OTHER PUBLICATIONS

R1-168337, "Draft CR on PRS sequence generation per TP." 3GPP TSG RAN WG1 Meeting #86. Gothenburg, Sweden. (2016).

European Search Report mailed May 16, 2022; European Patent Application No. 19857362.8.

LG Electronics: "Discussion on potential enhancements for indoor positioning," 3GPP Draft; R1-150229, vol. RAN WG1, No. Athens, Greece. (2015).

English Translation of International Search Report mailed Nov. 29, 2019; International Patent Application No. PCT/CN2019/104204 filed on Sep. 3, 2019. ISA/CN.

\* cited by examiner

POSITIONING REFERENCE SIGNAL TRANSMISSION METHOD AND APPARATUS, DEVICE, AND STORAGE MEDIUM

CROSS-REFERENCE TO RELATED APPLICATIONS

This is a National Stage Application, filed under 35 U.S.C. 371, of International Patent Application No. PCT/CN2019/104204, filed on Sep. 3, 2019, which claims priority to Chinese Patent Application No. 201811026575.5 filed on Sep. 4, 2018, the disclosures of which are incorporated herein by reference in their entireties.

TECHNICAL FIELD

The present application relates to the positioning technology of radio communications.

BACKGROUND

The millimeter-wave technology is used in a communication system of 5th generation mobile networks (5G) to implement a higher data transmission rate. A millimeter wave is an electromagnetic wave having a millimeter-scale wavelength. The frequency of the millimeter wave ranges from 30 GHz to 300 GHz. One feature of a frequency band of the millimeter wave is that the millimeter wave has serious attenuation in air and weak diffraction capacity and is greatly affected by atmospheric and rainwater absorption. To overcome these factors affecting propagation, a narrow beam after beamforming is used as the data transmission carrier in 5G, and the beam is sent in the scanning manner.

Support for positioning is introduced by long term evolution (LTE) since release 9. A positioning reference signal (PRS) is also introduced to implement downlink positioning. A typical method is observed time difference of arrival (OTDOA) positioning. Generally, a receiving node needs to measure downlink signals sent from one or more cells, and the position is further calculated by using the measurement results.

SUMMARY

The present disclosure provides a PRS transmission method applied on a PRS sending end. The method includes steps described below, PRS blocks having a same number as a number of shaped beams are preset, a corresponding PRS sequence is set in each PRS block by using a preset sequence generation rule, and each PRS block containing the corresponding PRS sequence is sent through a shaped beam corresponding to the each PRS block in a polling manner according to a preset sending order of the PRS blocks.

The present disclosure further provides a PRS transmission method applied on a PRS receiving end. The method includes steps described below, a first PRS block sent by a PRS sending end is acquired; and when the first PRS block contains a block index, a sending index of a shaped beam corresponding to the first PRS block corresponding to the block index is determined according to preset correspondence; or when the first PRS block contains no block index, a sending index of a shaped beam corresponding to the first PRS block is determined according to a preset calculation rule. The sending index of the shaped beam is used for determining a time-domain position of the shaped beam.

The present disclosure further provides a PRS transmission apparatus configured on a PRS sending end. The apparatus includes a setting module and a sending module. The setting module is configured to preset PRS blocks having a same number as a number of shaped beams, and set a corresponding PRS sequence in each PRS block by using a preset sequence generation rule. The sending module is configured to send, through a shaped beam corresponding to each PRS block, the each PRS block containing the corresponding PRS sequence in a polling manner according to a preset sending order of the PRS blocks.

The present disclosure further provides a PRS transmission apparatus configured on a PRS receiving end. The apparatus includes an acquisition module and a determination module. The acquisition module is configured to acquire a first PRS block sent by a PRS sending end; and in a case where the first PRS block contains a block index, determine a sending index of a shaped beam corresponding to the first PRS block corresponding to the block index according to preset correspondence; or in a case where the first PRS block contains no block index, determine a sending index of a shaped beam corresponding to the first PRS block according to a preset calculation rule. The sending index of the shaped beam is used for determining a time-domain position of the shaped beam.

The present disclosure further provides a computer readable storage medium storing a computer program. The computer program, when executed by a processor, implements the PRS transmission method applied to the PRS sending end. Alternatively, the computer program, when executed by a processor, implements the PRS transmission method applied to a PRS receiving end.

The present disclosure further provides a PRS transmission device. The device includes a processor and a memory configured to store a computer program executable on the processor. The processor is configured to, when executing the computer program, implement the PRS transmission method applied to the PRS sending end. Alternatively, the processor is configured to, when executing the computer program, implement the PRS transmission method applied to the PRS receiving end.

DETAILED DESCRIPTION

In LTE, a downlink PRS for measurement is usually sent in a broadcast mode. However, in the case of 5G beam scanning, the broadcast sending mode is no longer applicable. Currently, the goal of supporting OTDOA positioning has been established in the 5G standards. However, how to implement downlink positioning in a 5G millimeter-wave band is still blank.

Therefore, how to send a positioning reference signal in a beam scanning scenario so as to implement 5G downlink positioning is urgently to be solved.

In view of this, in an embodiment of the present disclosure, a PRS sending end presets PRS blocks having a same number as a number of shaped beams, a corresponding PRS sequence is set in each PRS block by using a preset sequence generation rule, and each PRS block containing the corresponding PRS sequence is sent in a polling manner according to a preset sending order of the PRS blocks through a shaped beam corresponding to the each PRS block. The PRS receiving end acquires a first PRS block sent by the PRS sending end; and in a case where the first PRS block contains a block index, a sending index of a shaped beam corresponding to the first PRS block corresponding to the block index is determined according to preset correspondence; or in a case where the first PRS block contains no block index, a sending index of a shaped beam corresponding to the first PRS block is determined according to a preset calculation rule. The sending index of the shaped beam is used for determining a time-domain position of the shaped beam.

Hereinafter the present disclosure is further described in detail in conjunction with the drawings and embodiments.

Figure 1:
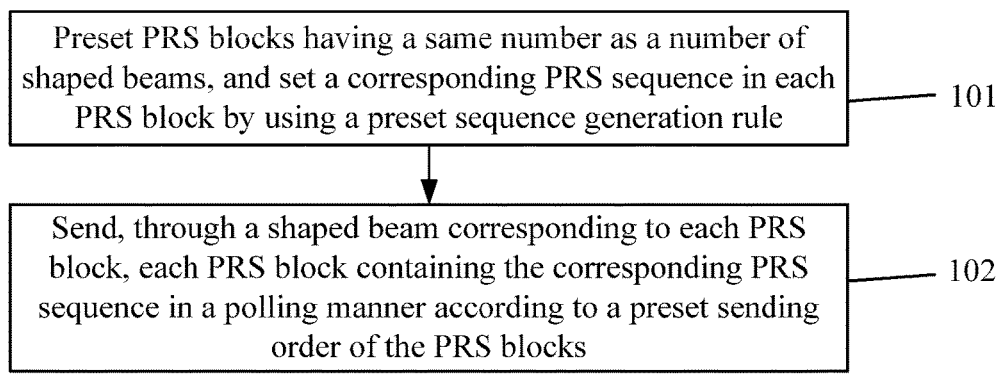
FIG. 1 is a flowchart of a PRS transmission method at a PRS sending end according to an embodiment of the present disclosure.
Figure 2:
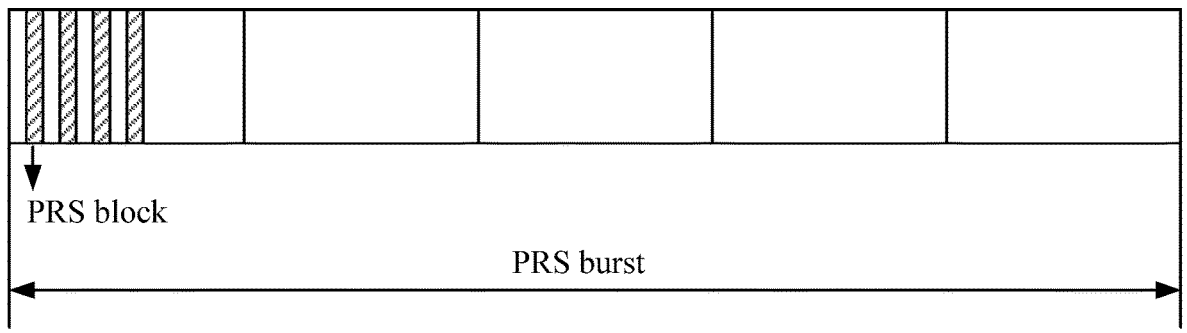
FIG. 2 is a schematic diagram of positions of PRS blocks according to an embodiment of the present disclosure.

This embodiment of the present disclosure provides a PRS transmission method applied on a PRS sending end. As shown in FIG. 1, the method includes steps 101 and 102.

In step 101, PRS blocks having a same number as a number of shaped beams are preset, and a corresponding PRS sequence is set in each PRS block by using a preset sequence generation rule.

The PRS sending end may be a radio communication base station or the like. Firstly, a scheduling period may be established to allocate a time-frequency resource to a positioning reference signal. The scheduling period may be $N_{burst}^{PRS}$ slots or a fixed time length, for example, 5 ms. One scheduling period may be referred to as one PRS burst. A time difference between PRS bursts is denoted as $T_{prs}$. Within one PRS burst, the resource allocated for sending the PRS is divided into $N_{max,beam}^{PRS}$ PRS blocks in time domain. In this way, the PRS blocks within one PRS burst may support the polling of $N_{max,beam}^{PRS}$ shaped beams. Each PRS block may be configured with $N_{symb}^{PRSbeam}$ symbols for the PRS sequence. $N_{symb}^{PRSbeam}$ may be set according to requirements, for example, $N_{max,beam}^{PRS}$ is set as 4 or 8.

The preset sequence generation rule may be set according to downlink positioning requirements. A different PRS sequence may be set on each symbol within a PRS block, and the different PRS sequence on each symbol may be generated by using a pseudo-random sequence or the like. Alternatively, the same PRS sequence may be used in each PRS block.

In an embodiment, after the PRS blocks having the same number as the number of shaped beams are preset, a block index corresponding to each PRS block may be set respectively according to the preset sending order.

The preset sending order may be set according to a reading sequence order of the PRS blocks or a sequence order of PRS blocks in the PRS burst. A sequence number of a PRS block in the PRS burst may be used as the block index of the PRS block. In the polling of shaped beams, the PRS blocks may be sent in a polling manner according to the block indexes of the PRS blocks. Here, the block index of each PRS block may be denoted as $l_{index}^{PRSB}$.

In an embodiment, within the PRS burst, the same PRS sequence may be used for each PRS block, or a different PRS sequence may be used for each PRS block.

Here, the same PRS sequence refers to that the PRS blocks use the same expression, and a variable of the expression is only related to an internal symbol of the PRS block and does not differ with different PRS blocks. For example, sequences of two PRS blocks are the same on symbols at the same position in their respective PRS blocks, but a sequence on each symbol of the same PRS block is different. The different PRS sequence refers to that a variable in the expression used by the PRS blocks varies with different PRS blocks. For example, a slot index is used as the variable, and thus, each PRS block has a different sequence.

Here, in this embodiment of the present disclosure, the PRS may be generated by using an existing PRS generation method in LTE. The PRS may be generated by expression (1).

$$r_{l,n_s}(m) = \frac{1}{\sqrt{2}}(1 - 2 \cdot c(2m)) + j\frac{1}{\sqrt{2}}(1 - 2 \cdot c(2m+1)), \qquad (1)$$

$$m = 0, 1, \ldots 2N_{RB}^{max,DL} - 1$$

$r_{l,n_s}(m)$ represents a PRS value. l represents an index of a symbol in a slot where the PRS sequence is located. $n_s$ represents a slot index corresponding to the PRS sequence. $N_{RB}^{max,DL}$ represents the maximum downlink bandwidth. Function expressions of c(2m) and c(2m+1) are represented by c(n), that is, n represents 2m or 2m+1. c(n) may be defined by expressions (2), (3) and (4).

$$c(n) = (x_1(n+N_c) + x_2(n+N_c)) \bmod 2 \qquad (2)$$

$$x_1(n+31) = (x_1(n+3) + x_1(n)) \bmod 2 \qquad (3)$$

$$x_2(n+31) = (x_2(n+3) + x_2(n+2) + x_2(n+1)x_2(n)) \bmod 2 \qquad (4)$$

The value of $N_c$ may be 1600; $x_1(0)=1$, $x_1(n)=0$, $n=1, 2 \ldots 30$; and $x_2$ is generated according to an initial value $(c_{init} = \sum_{n=0}^{30} x_2(n) \cdot 2^n)$ of the PRS sequence.

In an embodiment, when the same PRS sequence is used for each PRS block, generation of the initial value of the PRS sequence may use any one of expressions (5), (6), (7), (8) or (9).

$$c_{init} = 2^{12} \cdot (l \bmod N_{symb}^{PRSbeam} + 1)(2N_{ID}^{PRS} + 1) + N_{ID}^{PRS} \qquad (5)$$

$$c_{init} = 2^{10} \cdot (l \bmod N_{symb}^{PRSbeam} + 1)(2(N_{ID}^{PRS}/1024) + 1) + (N_{ID}^{PRS}/1024) \qquad (6)$$

$$c_{init} = 2^{10} \cdot (l \bmod N_{symb}^{PRSbeam} + 1(2n_{id} + 1) + n_{id} \qquad (7)$$

$$c_{init} = 2^{12} \cdot (14 \cdot 2^\mu \cdot \lfloor n_{s,f}/(5 \cdot 2^\mu) \rfloor + l \bmod N_{symb}^{PRSbeam} + 1)(2N_{ID}^{PRS} + 1) + N_{ID}^{PRS} \qquad (8)$$

$$c_{init} = 2^{13} \cdot (l \bmod N_{symb}^{PRSbeam} + 1)(2N_{ID}^{PRS} + 1) + N_{ID}^{PRS} \qquad (9)$$

In expressions (5), (6), (7) and (8), $N_{ID}^{PRS}$ may range from 0 to 4095. In expression (9), $N_{ID}^{PRS}$ may range from 0 to 8191.

When a different PRS sequence is used for each PRS block, generation of the initial value of the PRS sequence may use any one of expressions (10), (11), (12), (13) or (14).

$$c_{init}=(2^{12}\cdot(14n_{s,f}+l+1)(2N_{ID}^{PRS}+1)+N_{ID}^{PRS})\bmod 2^{31} \quad (10)$$

$$c_{init}=(2^{10}\cdot(14n_{s,f}+l+1)(2(N_{ID}^{PRS}/1024)+1)+(N_{ID}^{PRS}/1024))\bmod 2^{31} \quad (11)$$

$$c_{init}=\lfloor N_{ID}^{PRS}/1024\rfloor+(2^{10}\cdot(14n_{s,f}+l+1)(2(N_{ID}^{PRS}/1024)+1)+(N_{ID}^{PRS}/1024))\bmod 2^{29} \quad (12)$$

$$c_{init}=(2^{10}\cdot(14n_{s,f}+l+1)(2n_{id}+1)+n_{id})\bmod 2^{31} \quad (13)$$

$$c_{init}=(2^{12}\cdot(7l_{index}^{PRSB}+l+1)(2N_{ID}^{PRS}+1)+N_{ID}^{PRS})\bmod 2^{31} \quad (14)$$

$c_{init}$ represents the initial value of the PRS sequence. $N_{ID}^{PRS}$ represents a PRS serial number. $n_{id}$ represents a scrambling code serial number. μ represents the numerology, and μ has a value range of 0, 1, 2, 3 and 4. $n_{s,f}$ represents a slot index. $N_{symb}^{PRSbeam}$ represents a number of symbols contained in one PRS block. The numerology includes a sub-carrier spacing and a cyclic prefix (CP) length.

In an embodiment, the block index corresponding to each PRS block may be set on one of a preceding symbol before the PRS sequence or a next symbol after the PRS sequence in each PRS block, and the block index may be sent.

When the PRS sequence is added into the PRS block, first $N_{symb}^{PRSbeam}-1$ symbols in the PRS block may be used for sending the positioning reference signal, and the last symbol in the PRS block may be used for sending the block index, that is, the PRS block index. Alternatively, in the PRS block, the first symbol is used for sending the block index, and the remaining symbols are used for sending the PRS sequence. PRSs and PRS block indexes of different cells may be frequency division multiplexed.

Figure 3:
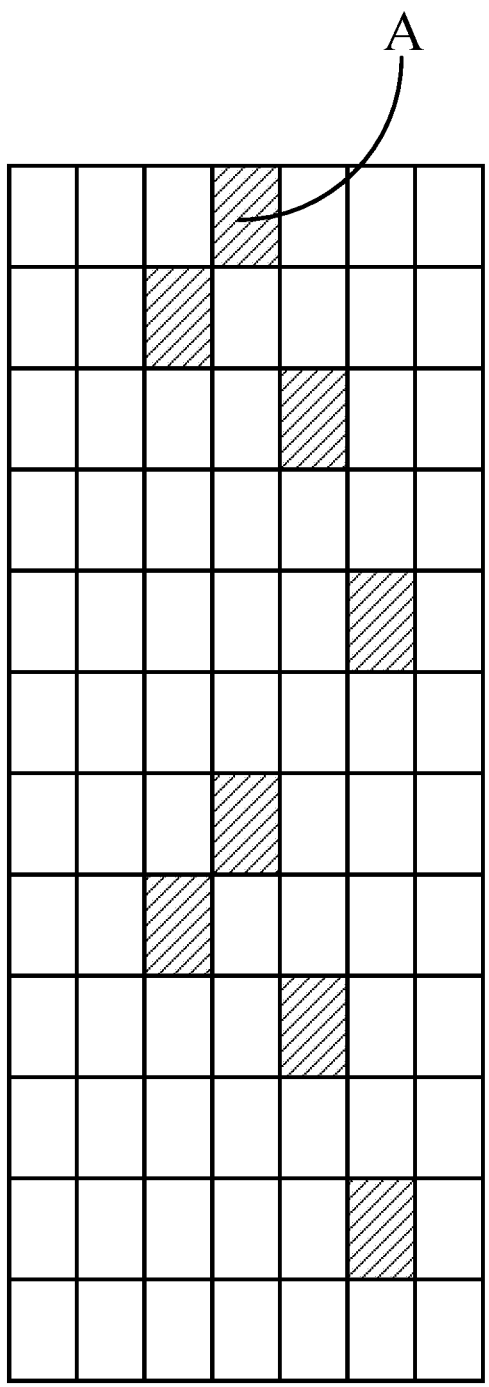
FIG. 3 is a schematic diagram of a type of allocating symbols in a PRS block according to an embodiment of the present disclosure.
Figure 4:
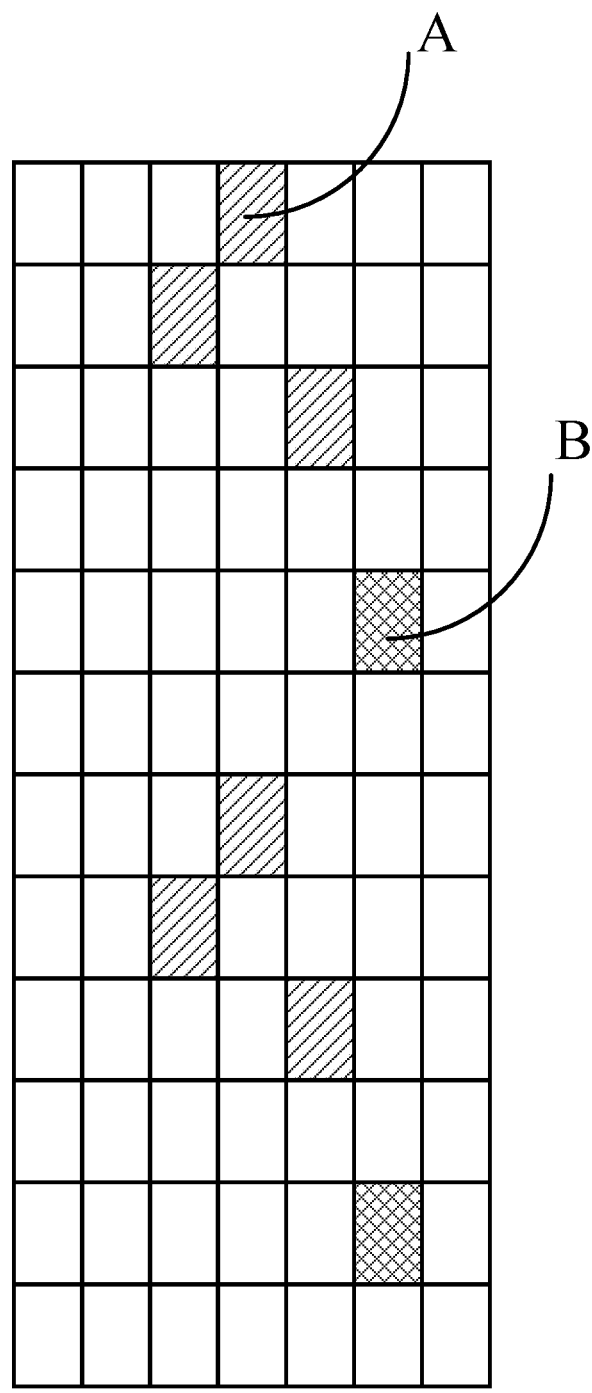
FIG. 4 is a schematic diagram of another two types of allocating symbols in a PRS block according to an embodiment of the present disclosure.

For example, in one PRS block, four symbols are allocated for sending a PRS related signal. As shown in FIG. 3, in one resource block (RB), four symbols are all used for sending a PRS sequence. A in the FIG. 3 represents the PRS sequence. As shown in FIG. 4, among four allocated symbols in one RB, the first three symbols are used for sending the PRS sequence, and the last symbol is used for sending the block index of the PRS block. In FIG. 4, A represents the PRS sequence, and B represents the block index, that is, the PRS block index.

In this way, there may be four combinations in the PRS blocks. Combination one: each PRS block sends the same content, and each PRS block contains apparent information about the PRS block index. Combination two: each PRS block sends the same content, and each PRS block contains no information about the PRS block index. Combination three: each PRS block sends different content, and each PRS block contains information about the PRS block index. Combination four: each PRS block sends different content, and each PRS block contains no information about the PRS block index.

In step 102, each PRS block is sent through a shaped beam corresponding to the each PRS block in a polling manner according to a preset sending order of the PRS blocks.

The sequence order of the PRS blocks in the PRS burst is used as the preset sending order of the PRS blocks. In a polling sending period of shaped beams, a PRS block as the first one in the sequence order corresponds to the first shaped beam. That is, the PRS block having the index of 1 is sent through the first shaped beam. A PRS block having the index of 2 is sent through the second shaped beam, and so on. Here, the block index may start from "0". The block index is not limited to a fixed form, which may be preset, or in the form of numbers, characters or the like, as long as the correspondence between the block index and the sending order of shaped beams can be determined. In this way, the correspondence between the block index of the PRS block and the sending index of the shaped beam is formed.

In this way, the sending of PRS may be completed. When a mobile terminal or another user equipment (UE) performs the positioning, a time-domain position of the shaped beam for sending the PRS or an index of the shaped beam for sending the PRS is identified according to a reception time to perform further processing, or the time-domain position or the index of the shaped beam for sending the PRS is identified by reading block index information to perform the further processing.

The positive effects of the present disclosure are described in further detail below in conjunction with different scenarios.

In a scenario one, when the sub-carrier spacing is 120 kHz, the length of one PRS burst is one half-frame, that is, 5 ms, and the maximum supported number of polling beams is 64. Thus, block indexes of various PRS blocks, that is, PRS block indexes ($l_{index}^{PRSB}$), within the PRS burst have a value range of 0 to 63, each PRS block contains four symbols, and time-domain positions are arranged as same as a synchronization signal (SS)/physical broadcast channel (PBCH) block in the same scenario.

If the PRS blocks use the form of combination one, then within one PRS block, the first three symbols are used for sending the PRS, and the last symbol is used for sending a PRS block index to indicate the block index of the current PRS block. The PRS sequence and the PRS block index are mapped to frequency domain in the manner of mod 6. The PRS is sent by using 64 beams.

If the PRS blocks use the form of combination two, the same PRS sequence is used for each PRS block, and all four symbols are used for sending the PRS sequence.

If the PRS blocks use the form of combination three, then within one PRS block, the first three symbols are used for sending the PRS, and the last symbol is used for sending the PRS block index to indicate the block index of the current PRS block. The PRS sequence and the PRS block index are mapped to frequency domain in the manner of mod 6.

If the PRS blocks use the form of combination four, a different PRS sequence is used for each PRS block, and all four symbols are used for sending the PRS sequence.

In a scenario two, the difference from the scenario one is that each PRS block contains seven symbols. In each corresponding combination, the seven symbols may all be used for sending the PRS sequence, or six symbols are used for sending the PRS sequence and one symbol is used for sending the PRS block index.

In a scenario three, if the sub-carrier spacing is 30 kHz, a polling of eight PRS beams is supported at most.

Figure 5:
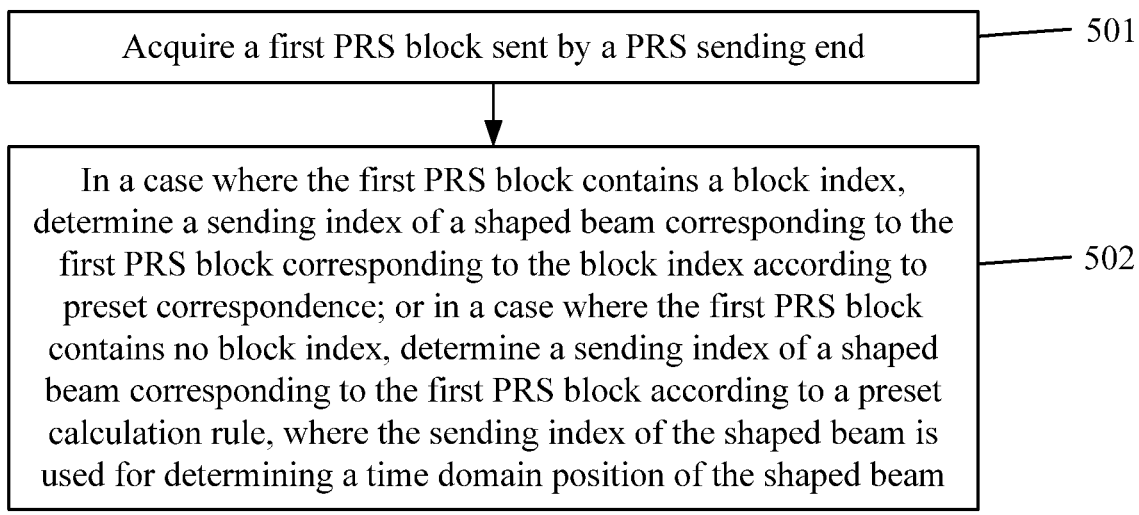
FIG. 5 is a flowchart of a PRS transmission method at a PRS receiving end according to an embodiment of the present disclosure.

An embodiment of the present disclosure further provides a PRS transmission method applied on a PRS receiving end. As shown in FIG. 5, the method includes steps 501 and 502.

In step 501, a first PRS block sent by a PRS sending end is acquired.

Here, the PRS receiving end may be as a mobile terminal or another UE. In 5G communications, the UE may receive a radio communication signal sent by a PRS sending end such as a base station, and the first PRS block sent by using a shaped beam as the carrier is parsed. The content of the first PRS block may be parsed through a protocol or the like.

In step 502, when the first PRS block contains a block index, a sending index of a shaped beam corresponding to the first PRS block corresponding to the block index is determined according to preset correspondence; or when the first PRS block contains no block index, a sending index of the shaped beam corresponding to the first PRS block is determined according to a preset calculation rule. The sending index of the shaped beam is used for determining a time-domain position of the shaped beam.

Here, the preset correspondence is formed on the PRS sending end. When PRS blocks are sent, block indexes of the PRS blocks have one-to-one correspondence with sending indexes of shaping beams. Therefore, the sending index of a shaped beam may be determined according to a block index of the received PRS block. Thus, the time-domain position of the shaped beam corresponding to the PRS block is determined in a shaped beam period. The content in the first PRS block may be parsed through the protocol or the like to determine whether the first PRS block contains the block index.

Using the scenario one as an example, assuming that in a scenario where the sub-carrier spacing is 120 kHz, the length of one PRS burst is one half-frame, that is, 5 ms, and the polling of 64 beams is supported at most, then the block index of the PRS block, that is, the PRS block index ($l_{index}^{PRSB}$), within the PRS burst ranges from 0 to 63, one PRS block contains four symbols, and time-domain positions are arranged as same as the SS/PBCH block in the same scenario.

If the PRS blocks use the form of combination one, within one PRS block, the first three symbols are used for sending the PRS, and the last symbol is used for sending the PRS block index to indicate the block index of the current PRS block. The PRS sequence and the PRS block index are mapped to frequency domain in the manner of mod 6. The PRS is sent by using 64 beams.

The UE performs detection in the whole polling period. The time-domain position and the sending index of the shaped beam are determined according to the block index of a detected PRS block. A time difference of arrival between two PRS blocks may be calculated according to the time-domain position of the shaped beam corresponding to the PRS block, and then the positioning is performed in the OTDOA mode and other modes.

The preset calculation rule may be set according to the beam polling period and the like. The sending index of the shaped beam corresponding to the received first PRS block may be calculated through a received known sending index of a shaped beam.

The sending index of the shaped beam is used for determining the time-domain position of the shaped beam. Determining the time-domain position of the shaped beam refers to determining the sending time of the PRS block corresponding to the shaped beam. In this way, a time difference of arrival between two PRS blocks may be determined by subtracting a time difference of sending between the two PRS blocks from a time difference of reception between the two PRS blocks.

In an embodiment, each received PRS block may be distinguished according to a preset sequence generation rule acquired from the PRS sending end in advance, and the sending index of the shaped beam corresponding to the first PRS block is determined according to a position of the first PRS block.

Assuming that there are eight PRS blocks within the sub-carrier interval of 30 kHz, that is, eight PRS blocks within 5 ms, each PRS block contains four symbols, and different PRS sequences are sent on the eight PRS blocks, the initial value may be represented by using expression (10). In this 5 ms, the initial value of the PRS sequence generated by any symbol is different and the PRS sequence generated by any symbol is also different. The receiving end may know the expression of the initial value and other rules through communications with a serving cell or through other auxiliary information. If a detected sequence corresponds to nine symbols, a time-domain position of the detected sequence may be known, and a second PRS block corresponding to the sequence may be known. In this way, it can be known that the sending index of the shaped beam corresponding to the PRS block is a corresponding value.

In this way, the positioning may be performed in the OTDOA mode or other modes according to a sending index difference between corresponding shaped beams.

In an embodiment, a time difference of reception between the first PRS block and the acquired second PRS block is divided by the time length of one symbol, the divided quotient is rounded down to obtain a symbol interval value between the sending index of the shaped beam corresponding to the first PRS and a sending index of a shaped beam corresponding to the second PRS block. Moreover, a product of the symbol interval value and the time length of one symbol is subtracted from a time difference of reception between the first PRS block and the second PRS block, and the subtracted difference is determined as a time difference of arrival between the first PRS block and the second PRS block.

A description is given by using an example where the sending end uses the PRS blocks in the form of combination two. Within one PRS block, four symbols are all used for sending the PRS sequence.

In the OTDOA positioning, each cell is synchronized. A UE receives a PRS signal from a serving cell at time $t_1$. Through mutual communications between serving cells, it has been known that a sending index of the beam is 3. After a time period of T, a PRS signal from a neighboring cell is received. At this time, the length of one symbol (including a CP) is $T_{symb}$, while the time length of beam transmission is generally less than $T_{symb}$. Assuming that $\lfloor T/T_{symb} \rfloor = 4$, it can be inferred that the signal is sent through the $4^{th}$ neighboring beam. That is, when a sending cell of the second PRS block is the serving cell, a beam index corresponding to the first PRS block may be determined according to a beam index corresponding to the second PRS block by using the symbol interval value.

The time difference of arrival between the first PRS block and the second PRS block may be represented by using the expression that $\Delta t = T - 4 \times T_{symb}$. $\Delta t$ represents the time difference of arrival, T represents the time difference of reception between the first PRS block and the second PRS block, 4 is the symbol interval value between the shaped beam corresponding to the first PRS block and the shaped beam corresponding to the second PRS block. The time difference of arrival may be used for the OTDOA positioning.

Figure 6:
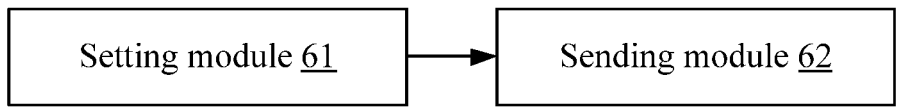
FIG. 6 is a schematic structural diagram of a PRS transmission apparatus at a PRS sending end according to an embodiment of the present disclosure.

An embodiment of the present disclosure provides a PRS transmission apparatus configured at a PRS sending end. As shown in FIG. 6, the apparatus includes a setting module 61 and a sending module 62.

The setting module 61 is configured to preset PRS blocks having a same number as a number of shaped beams, and set a corresponding PRS sequence in each PRS block by using a preset sequence generation rule.

The PRS sending end may be a radio communication base station or the like. Firstly, a scheduling period may be established to allocate a time-frequency resource to a positioning reference signal. The scheduling period may be $N_{burst}^{PRS}$ slots or a fixed time length, for example, 5 ms. One scheduling period may be referred to as one PRS burst. A time difference between PRS bursts is denoted as $T_{prs}$. In one PRS burst, the resource allocated for sending the PRS is divided into $N_{max,beam}^{PRS}$ PRS blocks in time domain. In this way, the PRS blocks in the PRS burst may support a polling of $N_{max,beam}^{PRS}$ shaped beams. Each PRS block may be configured with $N_{symb}^{PRSbeam}$ symbols for the PRS sequence. $N_{max,beam}^{PRS}$ may be set according to requirements, for example, $N_{max,beam}^{PRS}$ is set as 4 or 8.

The preset sequence generation rule may be set according to downlink positioning requirements. A different PRS sequence may be set on each symbol in the PRS block. A different PRS sequence on each symbol may be generated by using a pseudo-random sequence and the like. Alternatively, the same PRS sequence may be used in each PRS block.

In an embodiment, after the PRS blocks having the same number as the number of shaped beams are preset, a block index corresponding to each PRS block may set respectively according to the preset sending order.

The preset sending order may be set according to a reading sequence order of the PRS blocks or a sequence order of the PRS blocks in the PRS burst. A sequence number of a PRS block in the PRS burst may be used as the block index of the PRS block. In the polling of shaped beams, the PRS blocks may be sent in the polling manner according to block indexes of the PRS blocks. Here, the block index of each PRS block may be denoted as $l_{index}^{PRSB}$.

In an embodiment, within the PRS burst, the same PRS sequence may be used for each PRS block, or a different PRS sequence may be used for each PRS block.

Here, the same PRS sequence refers to that the PRS blocks use the same expression, and a variable of the expression is only related to an internal symbol in the PRS block and does not differ with different PRS blocks. For example, sequences of two PRS blocks are the same on symbols at the same position in their respective PRS blocks, but each symbol in the same PRS block has a different sequence. The different PRS sequence refers to that a variable in the expression used by the PRS blocks varies with different PRS blocks. For example, a slot index is used as the variable, and thus, each PRS block has a different sequence.

Here, in this embodiment of the present disclosure, the PRS may be generated by using the existing PRS generation method in LTE. The PRS may be generated by expression (1). $r_{l,n_s}(m)$ represents a PRS value. l represents an index of a symbol in a slot where the PRS sequence is located. $n_s$ represents a slot index corresponding to the PRS sequence. $N_{RB}^{max,DL}$ represents the maximum downlink bandwidth. Function expressions of c(2m) and c(2m+1) are represented by c(n), that is, n represents 2m or 2m+1. c(n) may be defined by expressions (2), (3) and (4), where the value of $N_c$ may be 1600; $x_1(0)=1$, $x_1(n)=0$, n=1, 2 ... 30; and $x_2(n)$ is generated according to an initial value ($c_{init}=\Sigma_{n=0}^{30} x_2(n) \cdot 2^n$) of the PRS sequence.

In an embodiment, when the same PRS sequence is used for each PRS block, generation of the initial value of the PRS sequence may use any one of expressions (5), (6), (7), (8) or (9). In expressions (5), (6), (7) and (8), $N_{ID}^{PRS}$ may range from 0 to 4095. In expression (9), $N_{ID}^{PRS}$ may range from 0 to 8191.

When a different PRS sequence is used for each PRS block, generation of the initial value of the PRS sequence may use any one of expressions (10), (11), (12), (13) or (14). $c_{init}$ represents the initial value of the PRS sequence. $N_{ID}^{PRS}$ represents a PRS serial number. $n_{id}$ represents a scrambling code serial number. μ represents the numerology, and μ has a value range of 0, 1, 2, 3 and 4. $n_{s,f}$ represents a slot index. $N_{symb}^{PRSbeam}$ represents the number of symbols contained in one PRS block. The numerology includes a sub-carrier spacing and a CP length.

In an embodiment, the block index corresponding to each PRS block may be set on one of a preceding symbol before the PRS sequence or a next symbol after the PRS sequence in each PRS block, the block index corresponding to each PRS block is sent.

When the PRS sequence is added to the PRS block, first $N_{symb}^{PRSbeam}-1$ symbols in the PRS block may be used for sending the positioning reference signal, and the last symbol in the PRS block may be used for sending the block index, that is, the PRS block index. Alternatively, in the PRS block, the first symbol may be used for sending the block index, and the remaining symbols may be used for sending the PRS sequence. PRSs and PRS block indexes of different cells may be frequency division multiplexed.

For example, in each PRS block, four symbols are allocated for sending a PRS related signal. As shown in FIG. 3, in one RB, four symbols are all used for sending the PRS sequence. A in FIG. 3 represents the PRS sequence. As shown in FIG. 4, among four allocated symbols in one RB, the first three symbols are used for sending the PRS sequence, and the last symbol is used for sending a block index of a PRS block. In FIG. 4, A represents the PRS sequence, and B represents the block index, that is, the PRS block index.

In this way, there may be four combinations in PRS blocks. Combination one: each PRS block sends the same content, and each PRS block contains apparent information about the PRS block index. Combination two: each PRS block sends the same content, and each PRS block contains no information about the PRS block index. Combination three: each PRS block sends different content, and each PRS block contains information about the PRS block index. Combination four: Each PRS block sends different content, and each PRS block contains no information about the PRS block index.

The sending module 62 is configured to send each PRS block according to a preset sending order of the PRS blocks in a polling manner through a shaped beam corresponding to the each PRS block.

The sequence order of the PRS blocks in the PRS burst is used as the preset sending order of the PRS blocks. In a polling sending period of shaped beams, a PRS block as the first one in the sequence order corresponds to the first shaped beam. That is, the PRS block having the index of 1 is sent through the first shaped beam. A PRS block having the index of 2 is sent through the second shaped beam, and so on. Here, the block index may start from "0". The block index is not limited to a fixed form, and may be preset, or in the form of numbers, characters or the like, as long as the correspondence between the block index and the sending order of shaped beams can be determined. In this way, the correspondence between the block index of the PRS block and the sending index of the shaped beam is formed.

In this way, the sending of the PRS may be completed. When a mobile terminal or another user equipment (UE) performs the positioning, a time-domain position or an index of the shaped beam for sending the PRS is identified according to a reception time to perform further processing, or the time-domain position or the index of the shaped beam for sending the PRS is identified by reading information about the block index to perform the further processing.

In practical applications, both the setting module 61 and the sending module 62 may be implemented by a central processing unit (CPU), a micro processing unit (MCU), a digital signal processor (DSP), a field-programmable gate array (FPGA) or the like in a base station and other signal sending devices.

Figure 7:
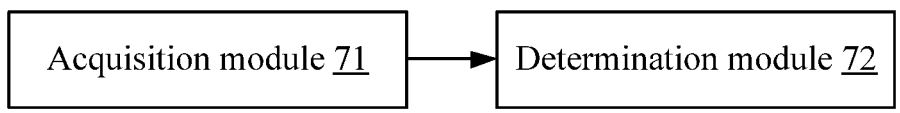
FIG. 7 is a schematic structural diagram of a PRS transmission apparatus at a PRS receiving end according to an embodiment of the present disclosure.

An embodiment of the present disclosure provides a PRS transmission apparatus configured at a PRS receiving end. As shown in FIG. 7, the apparatus includes an acquisition module 71 and a determination module 72.

The acquisition module 71 is configured to acquire a first PRS block sent by a PRS sending end.

Here, the PRS receiving end may be as a mobile terminal or another UE. In 5G communications, the UE may receive a radio communication signal sent by the base station or another PRS sending end. The first PRS block sent by using a shaped beam as the carrier is parsed. The content of the first PRS block is parsed through the protocol or the like.

The determination module 72 is configured to: when the first PRS block contains a block index, determine a sending index of the shaped beam corresponding to the first PRS block corresponding to the block index according to preset correspondence; or when the first PRS block contains no block index, determine a sending index of a shaped beam corresponding to the first PRS block according to a preset calculation rule. The sending index of the shaped beam is used for determining a time-domain position of the shaped beam.

Here, the preset correspondence is formed on the PRS sending end. When the PRS blocks are sent, block indexes of the PRS blocks have one-to-one correspondence with sending indexes of shaping beams. Therefore, the sending index of the shaped beam may be determined according to a block index of a received PRS block. Thus, the time-domain position of the shaped beam corresponding to the PRS block is determined in a shaped beam period. The content in the first PRS block may be parsed through the protocol or the like to determine whether the first PRS block contains the block index.

Using the scenario one as an example, assuming that in a scenario where the sub-carrier spacing is 120 kHz, the length of one PRS burst is one half-frame, that is, 5 ms, and a polling of 64 beams is supported at most, then the block index of each PRS block, that is, the PRS block index ($1_{index}^{PRSB}$), within the PRS burst ranges from 0 to 63, one PRS block contains four symbols, and time-domain positions are arranged as same as the SS/PBCH block in the same scenario.

If the PRS blocks use the form of combination one, within one PRS block, the first three symbols are used for sending the PRS, and the last symbol is used for sending the PRS block index to indicate a block index of the current PRS block. The PRS sequence and the PRS block index are mapped to frequency domain in the manner of mod 6. The PRS is sent by using 64 beams.

The UE performs detection in the whole polling period. The time-domain position and the sending index of the shaped beam are determined according to a block index of a detected PRS block. A time difference of arrival between two PRS blocks may be calculated according to the time-domain position of the shaped beam corresponding to the PRS block, thus the positioning is performed in the OTDOA mode or other modes.

The preset calculation rule may be set according to the beam polling period or the like. The sending index of the shaped beam corresponding to the received first PRS block may be calculated through a received known sending index of a shaped beam.

The sending index of the shaped beam is used for determining the time-domain position of the shaped beam. Determining the time-domain position of the shaped beam refers to determining the sending time of the PRS block corresponding to the shaped beam. In this way, the time difference of arrival between the two PRS blocks may be determined by subtracting a time difference of sending between the two PRS blocks from a time difference of reception between the two PRS blocks.

In an embodiment, each received PRS block may be distinguished according to a preset sequence generation rule acquired from the PRS sending end in advance, and the sending index of the shaped beam corresponding to the first PRS block is determined according to the position of the first PRS block.

Assuming that there are eight PRS blocks within the sub-carrier spacing of 30 kHz, that is, eight PRS blocks within 5 ms, each PRS block contains four symbols, and different PRS sequences are sent on the eight PRS blocks, the initial value may be calculated by using expression (10). In this 5 ms, the initial value of the PRS sequence generated by any symbol is different and the PRS sequence generated by any symbol is also different. The receiving end may know the initial value expression and other rules through communications with a serving cell or through other auxiliary information. If a detected sequence corresponds to nine symbols, a time-domain position of the detected sequence may be known, and a second PRS block corresponding to the sequence may be known. In this way, it can be known that the sending index of the shaped beam corresponding to the PRS block is a corresponding value.

In this way, the positioning may be performed in the OTDOA mode or other modes according to a sending index difference between corresponding shaped beams.

In an embodiment, a time difference of reception between the first PRS block and the acquired second PRS block is divided by the time length of one symbol, the divided quotient is rounded down to obtain a symbol interval value between the sending index of the shaped beam corresponding to the first PRS and a sending index of a shaped beam corresponding to the second PRS block. Moreover, a product of the symbol interval value and the time length of one symbol is subtracted from a time difference of reception between the first PRS block and the second PRS block, and the subtracted difference is determined as a time difference of arrival between the first PRS block and the second PRS block.

A description is given by using an example where the sending end uses the PRS blocks in the form of combination two. Within one PRS block, four symbols are all used for sending the PRS sequence. In the OTDOA positioning, each cell is synchronized. A UE receives a PRS signal from a serving cell at time $t_1$. Through mutual communications between serving cells, it has been known that the sending index of the beam is 3. After a time period of T, a PRS signal from a neighboring cell is received. At this time, the length of one symbol (including a CP) is $T_{symb}$, while a beam transmission time period is generally less than $T_{symb}$. Assuming that $\lfloor T/T_{symb} \rfloor = 4$, it can be inferred that the signal is sent through the $4^{th}$ neighboring beam. That is, when a sending cell of the second PRS block is the serving cell, a beam index corresponding to the first PRS block may be determined through a beam index corresponding to the second PRS block according to the symbol interval value.

The time difference of arrival between the first PRS block and the second PRS block may be represented by using the expression that $\Delta t = T - 4 \times T_{symb}$. $\Delta t$ represents the time difference of arrival. T represents the time difference of reception between the first PRS block and the second PRS block. 4 is the symbol interval value between the shaped beam corresponding to the first PRS block and the shaped beam corresponding to the second PRS block. The time difference of arrival may be used for the OTDOA positioning.

In practical applications, both the acquisition module 71 and the determination module 72 may be implemented by a CPU, an MCU, a DSP, or an FPGA in a UE or other signal receiving devices.

An embodiment of the present disclosure provides a storage medium storing an executable program. The program, when executed by a processor, implements a PRS transmission method applicable to a PRS sending end. As shown in FIG. 1, the method may include steps 101 and 102.

In step 101, PRS blocks having a same number as a number of shaped beams are preset, and a corresponding PRS sequence is set in each PRS block by using a preset sequence generation rule.

The PRS sending end may be a radio communication base station or the like. Firstly, a scheduling period may be established to allocate a time-frequency resource to the positioning reference signal. The scheduling period may be $N_{burst}^{PRS}$ slots or a fixed time length, for example, 5 ms. One scheduling period may be referred to as one PRS burst. A time difference between PRS bursts is denoted as $T_{prs}$. Within one PRS burst, the resource allocated for sending the PRS is divided into $N_{max,beam}^{PRS}$ PRS blocks in time domain. In this way, the PRS blocks in the PRS burst may support a polling of $N_{max,beam}^{PRS}$ shaped beams. Each PRS block may be configured with $N_{symb}^{PRSbeam}$ symbols for the PRS sequence. $N_{max,beam}^{PRS}$ may be set according to requirements, for example, $N_{max,beam}^{PRS}$ is set as 4 or 8.

The preset sequence generation rule may be set according to downlink positioning requirements. A different PRS sequence may be set on each symbol in the PRS block. A different PRS sequence on each symbol may be generated by using a pseudo-random sequence and the like. Alternatively, the same PRS sequence may be used in each PRS block.

In an embodiment, after the PRS blocks having the same number as the number of shaped beams are preset, a block index corresponding to each PRS block is set respectively for the each PRS block according to the preset sending order.

The preset sending order may be set according to a reading sequence order of the PRS blocks or a sequence order of the PRS blocks in the PRS burst. A sequence number of a PRS block in the PRS burst may be used as the block index of the PRS block. In the polling of shaped beams, the PRS blocks may be sent in the polling manner according to block indexes of the PRS blocks. Here, the block index of each PRS block may be denoted as $l_{index}^{PRSB}$.

In an embodiment, within the PRS burst, the same PRS sequence may be used for each PRS block, or a different PRS sequence may be used for each PRS block.

Here, the same PRS sequence refers to that the PRS blocks use the same expression, and a variable of the expression is only related to an internal symbol in the PRS block and does not differ with different PRS blocks. For example, sequences of two PRS blocks are the same on symbols at the same position in their respective PRS blocks, but each symbol in the same PRS block has a different sequence. The different PRS sequence refers to that a variable used among PRS blocks varies with different PRS blocks. For example, a slot index is used as the variable, and thus each PRS block has a different sequence.

Here, in this embodiment of the present disclosure, the PRS may be generated by using the existing PRS generation method in LTE. The PRS may be generated by expression (1). $r_{l,n_s}(m)$ represents a PRS value. l represents an index of a symbol in a slot where the PRS sequence is located. $n_s$ represents a slot index corresponding to the PRS sequence. $N_{RB}^{max,DL}$ represents the maximum downlink bandwidth. Function expressions of c(2m+1) and c(2m) are represented by c(n), that is, n represents 2m or 2m+1. c(n) may be defined by expressions (2), (3) and (4), where the value of $N_c$ may be 1600; $x_1(0)=1$, $x_1(n)=0$, n=1, 2 . . . 30; and $x_2(n)$ is generated according to an initial value ($c_{init}=\Sigma_{n=0}^{30} x_2(n) \cdot 2^n$) of the PRS sequence.

In an embodiment, when the same PRS sequence is used for each PRS block, generation of the initial value of the PRS sequence may use any one of expressions (5), (6), (7), (8) or (9). In expressions (5), (6), (7) and (8), $N_{ID}^{PRS}$ may range from 0 to 4095. In expression (9), $N_{ID}^{PRS}$ may range from 0 to 8191.

When a different PRS sequence is used for each PRS block, generation of the initial value of the PRS sequence may use any one of expressions (10), (11), (12), (13) or (14). $c_{init}$ represents the initial value of the PRS sequence. $N_{ID}^{PRS}$ represents a PRS serial number. $n_{id}$ represents a scrambling code serial number. μ represents the numerology, and μ has a value range of 0, 1, 2, 3 and 4. $n_{s,f}$ represents the slot index. $N_{symb}^{PRSbeam}$ represents a number of symbols contained in one PRS block. The numerology includes a sub-carrier spacing and a CP length.

In an embodiment, the block index corresponding to each PRS block may be set on one of a preceding symbol before the PRS sequence or a next symbol after the PRS sequence in the each PRS block, and the block index corresponding to each PRS block is sent.

When the PRS sequence is added to the PRS block, first $N_{symb}^{PRSbeam}-1$ symbols in the PRS block may be used for sending the positioning reference signal, and the last symbol in the PRS block may be used for sending the block index, that is, the PRS block index. Alternatively, in the PRS block, the first symbol may be used for sending the block index, and the remaining symbols may be used for sending the PRS sequence. PRSs and PRS block indexes of different cells may be frequency division multiplexed.

For example, in each PRS block, four symbols are allocated for sending a PRS related signal. As shown in FIG. 3, in one RB, four symbols are all used for sending the PRS sequence. A in FIG. 3 represents the PRS sequence. As shown in FIG. 4, among four allocated symbols in one RB, the first three symbols are used for sending the PRS sequence, and the last symbol is used for sending the block index of the PRS block. In FIG. 4, A represents the PRS sequence, and B represents the block index, that is, the PRS block index.

In this way, there may be four combinations in PRS blocks. Combination one: each PRS block sends the same content, and each PRS block contains apparent information about the PRS block index. Combination two: each PRS block sends the same content, and each PRS block contains no information about the PRS block index. Combination three: each PRS block sends different content, and each PRS block contains information about the PRS block index. Combination four: each PRS block sends different content, and each PRS block contains no information about the PRS block index.

In step 102, each PRS block is sent according to a preset sending order of the PRS blocks in a polling manner through a shaped beam corresponding to the each PRS block.

The sequence order of the PRS blocks in the PRS burst is used as the preset sending order of the PRS blocks. In the polling sending period of shaped beams, a PRS block as the first one in the sequence order corresponds to the first shaped beam. That is, the PRS block having the index of 1 is sent through the first shaped beam. A PRS block having the index of 2 is sent through the second shaped beam, and so on. Here, the block index may start from "0". The block index is not limited to a fixed form, and may be preset, or in the form of numbers, characters or the like, as long as the correspondence between the block index and the sending order of shaped beams can be determined. In this way, the correspondence between the PRS block index and the sending index of the shaped beam is formed.

The sending of the PRS may be completed in the above manner. When a mobile terminal or another user equipment (UE) performs the positioning, a time-domain position or an index of the shaped beam for sending the PRS is identified according to a reception time to perform further processing, or the time-domain position or the index of the shaped beam for sending the PRS is identified by reading information about the block index to perform the further processing.

The storage medium may store an executable program. The program, when executed by a processor, implements the PRS transmission method applicable to the PRS receiving end. As shown in FIG. 5, the method may include steps 501 and 502.

In step 501, a first PRS block sent by a PRS sending end is acquired.

Here, the PRS receiving end may be as a mobile terminal or another UE. In 5G communications, the UE may receive a radio communication signal sent by a base station or another PRS sending end, and the first PRS block sent by using a shaped beam as the carrier is parsed. The content of the first PRS block may be parsed through a protocol or the like.

In step 502, when the first PRS block contains a block index, a sending index of the shaped beam corresponding to the first PRS block corresponding to the block index is determined according to preset correspondence; or when the first PRS block contains no block index, a sending index of the shaped beam corresponding to the first PRS block is determined according to a preset calculation rule. The sending index of the shaped beam is used for determining a time-domain position of the shaped beam.

Here, the preset correspondence is formed on the PRS sending end. When the PRS blocks are sent, block indexes of the PRS blocks have one-to-one correspondence with sending indexes of shaped beams. Therefore, the sending index of the shaped beam may be determined according to a block index of a received PRS block. Thus, the time-domain position of the shaped beam corresponding to the PRS block is determined in a shaped beam period. The content in the first PRS block may be parsed through the protocol or the like to determine whether the first PRS block contains the block index.

Using the scenario one as an example, assuming that in a scenario where the sub-carrier spacing is 120 kHz, the length of one PRS burst is one half-frame, that is, 5 ms, and the polling of 64 beams is supported at most, then the block index of each PRS blocks, that is, the PRS block index ($l_{index}^{PRSB}$), within the PRS burst ranges from 0 to 63, one PRS block contains four symbols, and time-domain positions are arranged as same as the SS/PBCH block in the same scenario.

If the PRS blocks use the form of combination one, within one PRS block, the first three symbols are used for sending the PRS, and the last symbol is used for sending the PRS block index to indicate the block index of the current PRS block. The PRS sequence and the PRS block index are mapped to frequency domain in the manner of mod 6. The PRS is sent by using 64 beams.

The UE performs detection in the whole polling period. The time-domain position and the sending index of the shaped beam are determined according to the block index of the detected PRS block. A time difference of arrival between two PRS blocks may be calculated according to the time-domain position of the shaped beam corresponding to the PRS block, thus the positioning is performed in the OTDOA mode or other modes.

The preset calculation rule may be set according to the beam polling period or the like. The sending index of the shaped beam corresponding to the received first PRS block may be calculated through a received known sending index of a shaped beam.

The sending index of the shaped beam is used for determining the time-domain position of the shaped beam. Determining the time-domain position of the shaped beam refers to determining the sending time of the PRS block corresponding to the shaped beam. In this way, the time difference of arrival between two PRS blocks may be determined by subtracting a time difference of sending between the two PRS blocks from a time difference of reception between the two PRS blocks.

In an embodiment, each received PRS block may be distinguished according to a preset sequence generation rule acquired from the PRS sending end in advance, and the sending index of the shaped beam corresponding to the first PRS block is determined according to the position of the first PRS block.

Assuming that there are eight PRS blocks within the sub-carrier spacing of 30 kHz, that is, eight PRS blocks within 5 ms, each PRS block contains four symbols, and different PRS sequences are sent on the eight PRS blocks, the initial value may be calculated by using expression (10). In this 5 ms, the initial value of the PRS sequence generated by any symbol is different and the PRS sequence generated by any symbol is also different. The receiving end may know rules such as the initial value expression through communications with a serving cell or through other auxiliary information. If a detected sequence corresponds to nine symbols, a time-domain position of the detected sequence may be known, and a second PRS block corresponding to the sequence may be known. In this way, it can be known that the sending index of the shaped beam corresponding to the PRS block is a corresponding value.

In this way, the positioning may be performed in the OTDOA mode or other modes according to a sending index difference between corresponding shaped beams.

In an embodiment, a time difference of reception between the first PRS block and the acquired second PRS block is divided by the time length of one symbol, and the divided quotient is rounded down to obtain a symbol interval value between the sending index of the shaped beam corresponding to the first PRS and a sending index of a shaped beam corresponding to the second PRS block. Moreover, a product of the symbol interval value and the time length of one symbol is subtracted from a time difference of reception between the first PRS block and the second PRS block, and the subtracted difference is determined as a time difference of arrival between the first PRS block and the second PRS block.

A description is given by using an example where the sending end uses the PRS blocks in the form of combination two. Within one PRS block, four symbols are all used for sending the PRS sequence. In the OTDOA positioning, each cell is synchronized. A UE receives a PRS signal from a serving cell at time $t_1$. Through mutual communications between serving cells, it has been known that the sending index of the beam is 3. After a time period of T, a PRS signal from a neighboring cell is received. At this time, the length of one symbol (including a CP) is $T_{symb}$, while a beam transmission time period is generally less than $T_{symb}$. Assuming that $\lfloor T/T_{symb} \rfloor = 4$, it can be inferred that the signal is sent through the 4$^{th}$ neighboring beam. That is, when a sending cell of the second PRS block is the serving cell, a beam index corresponding to the first PRS block may be determined through a beam index corresponding to the second PRS block according to the symbol interval value.

The time difference of arrival between the first PRS block and the second PRS block may be represented by using the expression that $\Delta t = T - 4 \times T_{symb}$. $\Delta t$ represents the time difference of arrival. T represents the time difference of reception between the first PRS block and the second PRS block. 4 is the symbol interval value between the shaped beam corresponding to the first PRS block and the shaped beam corresponding to the second PRS block. The time difference of arrival may be used for the OTDOA positioning.

An embodiment of the present disclosure provides a PRS transmission apparatus. The apparatus includes a processor, a memory and an executable program stored in the memory and executable on the processor. The processor, when executing the executable program, implements the PRS transmission method. The method is applicable to a PRS sending end. As shown in FIG. 1, the method includes steps 101 and 102.

In step 101, PRS blocks having a same number as a number of shaped beams are preset, and a corresponding PRS sequence is set in each PRS block by using a preset sequence generation rule.

The PRS sending end may be a radio communication base station or the like. Firstly, a scheduling period may be established to allocate a time-frequency resource to a positioning reference signal. The scheduling period may be $N_{burst}^{PRS}$ slots or a fixed time length, for example, 5 ms. One scheduling period may be referred to as one PRS burst. The time difference between PRS bursts is denoted as $T_{prs}$. Within one PRS burst, the resource allocated for sending the PRS is divided into $N_{max,beam}^{PRS}$ PRS blocks in time domain. In this way, the PRS blocks within the PRS burst may support a polling of $N_{max,beam}^{PRS}$ shaped beams. Each PRS block may be configured with $N_{symb}^{PRSbeam}$ symbols for the PRS sequence. $N_{max,beam}^{PRS}$ may be set according to requirements, for example, $N_{max,beam}^{PRS}$ is set as 4 or 8.

The preset sequence generation rule may be set according to downlink positioning requirements. A different PRS sequence may be set on each symbol in the PRS block, and the different PRS sequence on each symbol may be generated by using a pseudo-random sequence or the like. Alternatively, the same PRS sequence may be used in each PRS block.

In an embodiment, after the PRS blocks having the same number as the number of shaped beams are preset, a block index corresponding to each PRS block is set for the each PRS block respectively according to the preset sending order.

The preset sending order may be set according to a reading sequence order of the PRS blocks or a sequence order of the PRS blocks in the PRS burst. A sequence number of a PRS block in the PRS burst may be used as the block index of the PRS block. In the polling of shaped beams, the PRS blocks may be sent in the polling manner according to block indexes of the PRS blocks. Here, the block index of the PRS block may be denoted as $l_{index}^{PRSB}$.

In an embodiment, within the PRS burst, the same PRS sequence may be used for each PRS block, or a different PRS sequence may be used for each PRS block.

Here, the same PRS sequence refers to that the PRS blocks use the same expression, and a variable of the expression is only related to an internal symbol in the PRS block and does not differ with different PRS blocks. For example, sequences of two PRS blocks are the same on symbols at the same position in their respective PRS blocks, but each symbol in the same PRS block has a different sequence. The different PRS sequence refers to that a variable in the expression used among the PRS blocks varies with different PRS blocks. For example, a slot index is used as the variable, thus each PRS block has a different sequence.

Here, in this embodiment of the present disclosure, the PRS may be generated by using the existing PRS generation method in LTE. The PRS may be generated by expression (1). $r_{l,n_s}(m)$ represents a PRS value. l represents an index of a symbol in a slot where the PRS sequence is located. $n_s$ represents a slot index corresponding to the PRS sequence. $N_{RB}^{max,DL}$ represents the maximum downlink bandwidth. Function expressions of c(2m) and c(2m+1) are represented by c(n), that is, n represents 2m or 2m+1. c(n) may be defined by expressions (2), (3) and (4), where the value of $N_c$ may be 1600; $x_1(0)=1$, $x_1(n)=0$, $n=1, 2 \ldots 30$; and $x_2(n)$ is generated according to the initial value ($c_{init} = \Sigma_{n=0}^{30} x_2(n) \cdot 2^n$) of the PRS sequence.

In an embodiment, when the same PRS sequence is used for each PRS block, generation of the initial value of the PRS sequence may use any one of expressions (5), (6), (7), (8) or (9). In expressions (5), (6), (7) and (8), $N_{ID}^{PRS}$ may range from 0 to 4095. In expression (9), $N_{ID}^{PRS}$ may range from 0 to 8191.

When the different PRS sequence is used for each PRS block, generation of the initial value of the PRS sequence may use any one of expressions (10), (11), (12), (13) or (14). $c_{init}$ represents the initial value of the PRS sequence. $N_{ID}^{PRS}$ represents a PRS serial number. $n_{id}$ represents a scrambling code serial number. μ represents the numerology, and μ has a value range of 0, 1, 2, 3 and 4. $n_{s,f}$ represents the slot index. $N_{symb}^{PRSbeam}$ represents the number of symbols contained in one PRS block. The numerology includes the sub-carrier spacing and the CP length.

In an embodiment, the block index corresponding to each PRS block may be set on one of a preceding symbol before the PRS sequence or a next symbol after the PRS sequence in the each PRS block, and the block index corresponding to each PRS block is sent.

When the PRS sequence is added to the PRS block, first $N_{symb}^{PRSbeam}-1$ symbols in the PRS block may be used for sending the positioning reference signal, and the last symbol in the PRS block may be used for sending the block index, that is, the PRS block index. Alternatively, in the PRS block, the first symbol may be used for sending the block index, and the remaining symbols may be used for sending the PRS sequence. PRSs and PRS block indexes of different cells may be frequency division multiplexed.

For example, in each PRS block, four symbols are allocated for sending a PRS related signal. As shown in FIG. 3, in one RB, four symbols are all used for sending the PRS sequence. A in FIG. 3 represents the PRS sequence. As shown in FIG. 4, among four allocated symbols in one RB, the first three symbols are used for sending the PRS sequence, and the last symbol is used for sending the block index of the PRS block. In FIG. 4, A represents the PRS sequence, and B represents the block index, that is, the PRS block index.

In this way, there may be four combinations in PRS blocks. Combination one: each PRS block sends the same content, and each PRS block contains apparent information about the PRS block index. Combination two: each PRS block sends the same content, and each PRS block contains no information about the PRS block index. Combination three: each PRS block sends different content, and each PRS block contains information about the PRS block index. Combination four: each PRS block sends different content, and each PRS block contains no information about the PRS block index.

In step 102, each PRS block is sent through a shaped beam corresponding to each PRS block in a polling manner according to a preset sending order of the PRS blocks.

The sequence order of the PRS blocks in the PRS burst is used as the preset sending order of the PRS blocks. In a polling sending period of shaped beams, a PRS block as the first one in the sequence order corresponds to the first shaped beam. That is, the PRS block having the index of 1 is sent through the first shaped beam. A PRS block having the index of 2 is sent through the second shaped beam, and so on. Here, the block index may start from "0". The block index is not limited to a fixed form, and may be preset or in the form of numbers, characters or the like, as long as the correspondence between the block index and the sending order of shaped beams can be determined. In this way, the correspondence between the PRS block index and the sending index of the shaped beam is formed.

In this way, the sending of the PRS may be completed. When a mobile terminal or another user equipment (UE) performs the positioning, a time-domain position or an index of the shaped beam for sending the PRS is identified according to a reception time to perform further processing, or the time-domain position or the index of the shaped beam for sending the PRS is identified by reading information about the block index to perform the further processing.

The storage medium may store an executable program. The executable program, when executed by a processor, implements the PRS transmission method applicable to a PRS receiving end. As shown in FIG. 5, the method may include steps 501 and 502.

In step 501, a first PRS block sent by a PRS sending end is acquired.

Here, the PRS receiving end may be as a mobile terminal or another UE. In 5G communications, the UE may receive a radio communication signal sent by a base station or another PRS sending end. The first PRS block sent by using a shaped beam as the carrier is parsed. The content of the first PRS block may be parsed through a protocol or the like.

In step 502, when the first PRS block contains a block index, a sending index of the shaped beam corresponding to the first PRS block corresponding to the block index is determined according to preset correspondence; or when the first PRS block contains no block index, a sending index of the shaped beam corresponding to the first PRS block is determined according to a preset calculation rule. The sending index of the shaped beam is used for determining a time-domain position of the shaped beam.

Here, the preset correspondence is formed on the PRS sending end. When the PRS blocks are sent, block indexes of the PRS blocks have one-to-one correspondence with sending indexes of shaped beams. Therefore, the sending index of the shaped beam may be determined according to the block index of a received PRS block. Thus, the time-domain position of the shaped beam corresponding to the PRS block is determined in a shaped beam period. The content in the first PRS block may be parsed through the protocol or the like to determine whether the first PRS block contains the block index.

Using the scenario one as an example, assuming that in a scenario where the sub-carrier spacing is 120 kHz, the length of one PRS burst is one half-frame, that is, 5 ms, and the polling of 64 beams is supported at most, then the block index of each PRS block, that is, the PRS block index ($l_{index}^{PRSB}$), within the PRS burst ranges from 0 to 63, one PRS block contains four symbols, and time-domain positions are arranged as same as the SS/PBCH block in the same scenario.

If the PRS blocks use the form of combination one, within one PRS block, the first three symbols are used for sending the PRS, and the last symbol is used for sending the PRS block index to indicate a block index of the current PRS block. The PRS sequence and the PRS block index are mapped to frequency domain in the manner of mod 6. The PRS is sent by using 64 beams.

The UE performs detection in the whole polling period. The time-domain position and the sending index of the shaped beam are determined according to the block index of the detected PRS block. A time difference of arrival between two PRS blocks may be calculated according to the time-domain position of the shaped beam corresponding to the PRS block, thus the positioning is performed in the OTDOA mode or other modes.

The preset calculation rule may be set according to the beam polling period or the like. The sending index of the shaped beam corresponding to the received first PRS block may be calculated through a received known sending index of a shaped beam.

The sending index of the shaped beam is used for determining the time-domain position of the shaped beam. Determining the time-domain position of the shaped beam refers to determining the sending time of the PRS block corresponding to the shaped beam. In this way, the time difference of arrival between two PRS blocks may be determined by subtracting a time difference of sending between the two PRS blocks from a time difference of reception between the two PRS blocks.

In an embodiment, each received PRS block may be distinguished according to a preset sequence generation rule acquired from the PRS sending end in advance, and the sending index of the shaped beam corresponding to the first PRS block is determined according to the position of the first PRS block.

Assuming that there are eight PRS blocks within the sub-carrier spacing of 30 kHz, that is, eight PRS blocks within 5 ms, each PRS block contains four symbols, and different PRS sequences are sent on the eight PRS blocks, the initial value may be calculated by using expression (10). In this 5 ms, the initial value of the PRS sequence generated by any symbol is different and the PRS sequence generated by any symbol is also different. The receiving end may know the initial value expression and other rules through communications with a serving cell or through other auxiliary information. If a detected sequence corresponds to nine symbols, the time-domain position of the detected sequence may be known, and a second PRS block corresponding to the sequence may be known. In this way, it can be known that the sending index of the shaped beam corresponding to the PRS block is a corresponding value.

In this way, the positioning may be performed in the OTDOA mode or other modes according to a sending index difference between corresponding shaped beams.

In an embodiment, a time difference of reception between the first PRS block and the acquired second PRS block is divided by the time length of one symbol, and the divided quotient is rounded down to obtain a symbol interval value between the sending index of the shaped beam corresponding to the first PRS and a sending index of a shaped beam corresponding to the second PRS block. Moreover, a product of the symbol interval value and the time length of one symbol is subtracted from a time difference of reception between the first PRS block and the second PRS block, and the subtracted difference is determined as a time difference of arrival between the first PRS block and the second PRS block.

A description is given by using an example where the sending end uses the PRS blocks in the form of combination two. Within one PRS block, four symbols are all used for sending the PRS sequence.

In the OTDOA positioning, each cell is synchronized. A UE receives a PRS signal from a serving cell at time $t_1$. Through mutual communications between serving cells, it has been known that a sending index of the beam is 3. After a time period of T, a PRS signal from a neighboring cell is received. At this time, the length of one symbol (including a CP) is $T_{symb}$, while a beam transmission time period is generally less than $T_{symb}$. Assuming that $\lfloor T/T_{symb} \rfloor = 4$, it can be inferred that the signal is sent through the $4^{th}$ neighboring beam. That is, when a sending cell of the second PRS block is the serving cell, a beam index corresponding to the first PRS block may be determined through a beam index corresponding to the second PRS block according to the symbol interval value.

The time difference of arrival between the first PRS block and the second PRS block may be represented by using the expression that $\Delta t = T - 4 \times T_{symb}$. $\Delta t$ represents the time difference of arrival. T represents the time difference of reception between the first PRS block and the second PRS block. 4 is the symbol interval value between the shaped beam corresponding to the first PRS block and the shaped beam corresponding to the second PRS block. The time difference of arrival may be used for the OTDOA positioning.

The above are only exemplary embodiments of the present disclosure and are not intended to limit the scope of the present disclosure. Any modifications, equivalent substitution, improvement and the like made within the spirit and principle of the present disclosure fall within the scope of the present disclosure.

What is claimed is:

1. A positioning reference signal (PRS) transmission method, applied to a PRS sending end, comprising:
presetting PRS blocks having a same number as a number of shaped beams, and setting a corresponding PRS sequence in each of the PRS blocks by using a preset sequence generation rule; and
sending, through a shaped beam corresponding to each of the PRS blocks, the each of the PRS blocks containing the corresponding PRS sequence in a polling manner according to a preset sending order of the PRS blocks;
wherein after presetting the PRS blocks having the same number as the number of shaped beams, the method further comprises:
setting a block index corresponding to each of the PRS blocks respectively according to the preset sending order, wherein a sending index of a shaped beam corresponding to a PRS block corresponding to the block index is determined by a PRS receiving end according to preset correspondence.

2. The method of claim 1, further comprising:
setting the block index on one of a preceding symbol before the PRS sequence or a next symbol after the PRS sequence in each of the PRS blocks, and sending the block index.

3. A non-transitory computer-readable storage medium, storing a computer program, wherein the computer program, when executed by a processor, implements the method of claim 2.

4. The method of claim 2, wherein setting the corresponding PRS sequence in each of the PRS blocks by using the preset sequence generation rule comprises:
using a same PRS sequence or a different PRS sequence for each of the PRS blocks.

5. The method of claim 1, wherein setting the corresponding PRS sequence in each of the PRS blocks by using the preset sequence generation rule comprises:
using a same PRS sequence or a different PRS sequence for each of the PRS blocks.

6. The method of claim 5, wherein in a case of using the same PRS sequence for each of the PRS blocks, an expression for generating an initial value of the PRS sequence comprises one of:

$c_{init} = 2^{12} \cdot (l \bmod N_{symb}^{PRSbeam} + 1)(2N_{ID}^{PRS} + 1) + N_{ID}^{PRS}$;

$c_{init} = 2^{10} \cdot (l \bmod N_{symb}^{PRSbeam} + 1)(2(N_{ID}^{PRS}/1024) + 1) + (N_{ID}^{PRS}/1024)$;

$c_{init} = 2^{10} \cdot (l \bmod N_{symb}^{PRSbeam} + 1)(2n_{id} + 1) + n_{id}$;

$c_{init} = 2^{12} \cdot (14 \cdot 2^\mu \cdot \lfloor n_{s,f}/(5 \cdot 2^\mu) \rfloor + l \bmod N_{symb}^{PRSbeam} + 1)(2N_{ID}^{PRS} + 1) + N_{ID}^{PRS}$; or $c_{init} = 2^{13} \cdot (l \bmod N_{symb}^{PRSbeam} + 1)(2N_{ID}^{PRS} + 1) + N_{ID}^{PRS}$;

in a case of using the different PRS sequence for each of the PRS blocks, an expression for generating an initial value of the PRS sequence comprises one of:

$c_{init} = (2^{12} \cdot (14n_{s,f} + l + 1)(2N_{ID}^{PRS} + 1) + N_{ID}^{PRS}) \bmod 2^{31}$;

$c_{init} = (2^{10} \cdot (14n_{s,f} + l + 1)(2(N_{ID}^{PRS}/1024) + 1) + (N_{ID}^{PRS}/1024)) \bmod 2^{31}$;

$c_{init} = \lfloor N_{ID}^{PRS}/1024 \rfloor + (2^{10} \cdot (14n_{s,f} + l + 1)(2(N_{ID}^{PRS}/1024) + 1) + (N_{ID}^{PRS}/1024)) \bmod 2^{29}$;

$c_{init} = (2^{10} \cdot (14n_{s,f} + l + 1)(2n_{id} + 1) + n_{id}) \bmod 2^{31}$; or $c_{init} = (2^{12} \cdot (7l_{index}^{PRSB} + l + 1)(2N_{ID}^{PRS} + 1) + N_{ID}^{PRS}) \bmod 2^{31}$;

wherein $c_{init}$ represents the initial value of the PRS sequence, l represents an index of a symbol in a slot where the PRS sequence is located, $N_{ID}^{PRS}$ represents a PRS serial number, $n_{id}$ represents a scrambling code serial number, and $\mu$ has a value range of 0, 1, 2, 3 and 4, $n_{s,f}$ represents a slot index, $l_{index}^{PRSB}$ represents a block index, and $N_{symb}^{PRSbeam}$ represents a number of symbols contained in each of the PRS blocks.

7. A non-transitory computer-readable storage medium, storing a computer program, wherein the computer program, when executed by a processor, implements the method of claim 6.

8. A non-transitory computer-readable storage medium, storing a computer program, wherein the computer program, when executed by a processor, implements the method of claim 5.

9. A non-transitory computer-readable storage medium, storing a computer program, wherein the computer program, when executed by a processor, implements the method of claim 1.

10. A positioning reference signal (PRS) transmission method, applied to a PRS receiving end, comprising:
acquiring a PRS block sent by a PRS sending end; and
in response to a block index contained in the PRS block, determining a sending index of a shaped beam corresponding to the PRS block corresponding to the block index according to preset correspondence;
wherein the sending index of the shaped beam is used for determining a time-domain position of the shaped beam, and the preset correspondence is one-to-one correspondence between block indexes of PRS blocks and sending indexes of shaping beams and is formed on the PRS sending end when the PRS blocks are sent.

11. The method of claim 10, further comprising: in response to no block index contained in the PRS block, determining the sending index of the shaped beam corresponding to the PRS block according to a preset calculation rule, wherein determining the sending index of the shaped beam corresponding to the PRS block according to the preset calculation rule comprises:
distinguishing each received PRS block according to a preset sequence generation rule acquired from the PRS sending end in advance, and determining the sending index of the shaped beam corresponding to the PRS block according to a position of the PRS block.

12. A positioning reference signal (PRS) transmission device, comprising:
a processor and a memory configured to store a computer program executable on the processor,
wherein the processor is configured to, when executing the computer program, implement the method of claim 11.

13. The method of claim 10, further comprising: performing positioning through the following operations:
dividing a time difference of reception between the PRS block and an acquired second PRS block by a time length of one symbol, and rounding down a divided quotient to obtain a symbol interval value between the sending index of the shaped beam corresponding to the first PRS and a sending index of a shaped beam corresponding to the second PRS block; and
subtracting a product of the symbol interval value and the time length of the one symbol from the time difference of reception between the PRS block and the second PRS block, and determining a subtracted difference as a time difference of arrival between the PRS block and the second PRS block.

14. A positioning reference signal (PRS) transmission device, comprising:
a processor and a memory configured to store a computer program executable on the processor,
wherein the processor is configured to, when executing the computer program, implement the following:
presetting PRS blocks having a same number as a number of shaped beams, and setting a corresponding PRS sequence in each of the PRS blocks by using a preset sequence generation rule; and
sending, through a shaped beam corresponding to each of the PRS blocks, the each of the PRS blocks containing the corresponding PRS sequence in a polling manner according to a preset sending order of the PRS blocks;
wherein after presetting the PRS blocks having the same number as the number of shaped beams, the method further comprises:
setting a block index corresponding to each of the PRS blocks respectively according to the preset sending order, wherein a sending index of a shaped beam corresponding to a PRS block corresponding to the block index is determined by a PRS receiving end according to preset correspondence.

15. The PRS transmission device of claim 14, wherein when executing the computer program, the processor is configured to implement setting the corresponding PRS sequence in each of the PRS blocks by using the preset sequence generation rule by:
using a same PRS sequence or a different PRS sequence for each of the PRS blocks.

16. The PRS transmission device of claim 15, wherein in a case of using the same PRS sequence for each of the PRS blocks, an expression for generating an initial value of the PRS sequence comprises one of:

$c_{init} = 2^{12} \cdot (l \bmod N_{symb}^{PRSbeam} + 1)(2N_{ID}^{PRS} + 1) + N_{ID}^{PRS}$;

$c_{init} = 2^{10} \cdot (l \bmod N_{symb}^{PRSbeam} + 1)(2(N_{ID}^{PRS}/1024) + 1) + (N_{ID}^{PRS}/1024)$;

$c_{init} = 2^{10} \cdot (l \bmod N_{symb}^{PRSbeam} + 1(2n_{id} + 1) + n_{id}$;

$c_{init} = 2^{12} \cdot (14 \cdot 2^{\mu} \cdot \lfloor n_{s,f}/(5 \cdot 2^{\mu}) \rfloor + l \bmod N_{symb}^{PRSbeam} + 1)(2N_{ID}^{PRS} + 1) + N_{ID}^{PRS}$; or $c_{init} = 2^{13} \cdot (l \bmod N_{symb}^{PRSbeam} + 1)(2N_{ID}^{PRS} + 1) + N_{ID}^{PRS}$; and in a case of each of the PRS blocks using the different PRS sequence, use one of the following expressions for generating an initial value of the PRS sequence:

$c_{init} = (2^{12} \cdot (14n_{s,f} + l + 1)(2N_{ID}^{PRS} + 1) + N_{ID}^{PRS}) \bmod 2^{31}$;

$c_{init} = (2^{10} \cdot (14n_{s,f} + l + 1)(2(N_{ID}^{PRS}/1024) + 1) + (N_{ID}^{PRS}/1024)) \bmod 2^{31}$;

$c_{init} = \lfloor N_{ID}^{PRS}/1024 \rfloor + (2^{10} \cdot (14n_{s,f} + l + 1)(2(N_{ID}^{PRS}/1024) + 1) + (N_{ID}^{PRS}/1024)) \bmod 2^{29}$;

$c_{init} = (2^{10} \cdot (14n_{s,f} + l + 1)(2n_{id} + 1) + n_{id}) \bmod 2^{31}$; or $c_{init} = 2^{12} \cdot (7l_{index}^{PRSB} + l + 1)(2N_{ID}^{PRS} + + 1) + N_{ID}^{PRS}) \bmod 2^{31}$;

wherein $c_{init}$ represents the initial value of the PRS sequence, l represents an index of a symbol in a slot where the PRS sequence is located, $N_{ID}^{PRS}$ represents a PRS serial number, $n_{id}$ represents a scrambling code serial number, and μ has a value range of 0, 1, 2, 3 and 4, $n_{s,f}$ represents a slot index, $l_{index}^{PRSB}$ represents a block index, and $N_{symb}^{PRSbeam}$ represents a number of symbols contained in eash of the PRS blocks.

17. A positioning reference signal (PRS) transmission device, comprising:
a processor and a memory configured to store a computer program executable on the processor,
wherein the processor is configured to, when executing the computer program, implement the method of claim 13.

18. A positioning reference signal (PRS) transmission device, comprising:

a processor and a memory configured to store a computer program executable on the processor, wherein the processor is configured to, when executing the computer program, implement the method of claim 10.

19. A non-transitory computer-readable storage medium, storing a computer program, wherein the computer program, when executed by a processor, implements the method of claim 10.

20. The PRS transmission device of claim 14, wherein when executing the computer program, the processor is configured to further implement the following:

setting the block index on one of a preceding symbol before the PRS sequence or a next symbol after the PRS sequence in each of the PRS blocks, and sending the block index.

* * * * *